United States Patent
McDonnell et al.

(10) Patent No.: US 7,129,316 B2
(45) Date of Patent: Oct. 31, 2006

(54) PROCESS FOR THE MANUFACTURE OF POLYESTER VIA HYDROGENATION TREATMENT OF RECYCLED DIOL

(75) Inventors: Finbar Gerald McDonnell, Cleveland (GB); Clive Alexander Hamilton, North Yorkshire (GB); Alexander Stuart Coote, Cleveland (GB)

(73) Assignee: Invista North America S.A R.L., Wilmington, DE (US)

( * ) Notice: Subject to any disclaimer, the term of this patent is extended or adjusted under 35 U.S.C. 154(b) by 0 days.

(21) Appl. No.: 10/753,044

(22) Filed: Jan. 7, 2004

(65) Prior Publication Data

US 2005/0148757 A1 Jul. 7, 2005

(51) Int. Cl.
*C08G 63/00* (2006.01)

(52) U.S. Cl. .................. 528/272; 526/67; 526/68; 528/176; 528/271

(58) Field of Classification Search .............. 526/67, 526/68; 528/176, 272
See application file for complete search history.

(56) References Cited

U.S. PATENT DOCUMENTS

| | | | |
|---|---|---|---|
| 4,110,316 A | 8/1978 | Edging et al. | |
| 5,837,786 A * | 11/1998 | Miyoshi et al. | 526/68 |
| 6,232,512 B1 * | 5/2001 | Haas et al. | 568/914 |
| 6,245,879 B1 * | 6/2001 | Kelsey et al. | 528/275 |
| 6,649,731 B1 * | 11/2003 | Hori et al. | 528/279 |

FOREIGN PATENT DOCUMENTS

| | | | |
|---|---|---|---|
| BE | 720 959 A | | 3/1969 |
| EP | 0 434 925 A | | 7/1991 |
| JP | 200302963 | * | 1/2003 |
| WO | WO 01/47850 A | | 7/2001 |
| WO | WO 02/18471 | | 3/2002 |

OTHER PUBLICATIONS

Japanese patent application, Kokal No. SHO 51[1976]-1403.
Japanese patent application, Kokoku No. HEI 4[1992]-28247.
Database WPI, Section Ch, Week 197608, Derwent Publications, Ltd., London, GB; XP002297617 & JP 51 001403 A (Toyo Spinning Co. Ltd.).
Database WPI, Section CH, Week 198748, Derwent Publications, Ltd., London, GB, XP002297618 & DD 247 579 (Veb Chem Leipzig-GR).
Patent Abstracts of Japan, vol. 0110, No. 24 (C-399), Jan. 23, 1987 & JP 61 197534A (Mitsubishi Chem Ind).

* cited by examiner

*Primary Examiner*—Terressa Boykin
(74) *Attorney, Agent, or Firm*—Charles E. Krukiel

(57) ABSTRACT

An improved process for recycling unspent diol removed from a polyester manufacturing process wherein the diol is captured, hydrogenated, and recycled so that the final polyester product has improved color over polyesters produced using other recycled diols.

6 Claims, 1 Drawing Sheet

PROCESS FOR THE MANUFACTURE OF POLYESTER VIA HYDROGENATION TREATMENT OF RECYCLED DIOL

FIELD OF THE INVENTION

The present invention relates to a process for purifying recycled diol in a polyester manufacturing process by capturing unspent diol, hydrogenating impurities in the diol and then recycling the diol. Following the purification of the recycled diol, the final polyester product has reduced color (improved transparency) over polyesters manufactured with recycled diols where impurities are not removed from the recycled diols.

BACKGROUND OF THE INVENTION

Polyesters such as, for example, polyethylene terephthalate and polybutylene terephthalate, generally referred to as "polyalkene terephthalates", are a class of important industrial polymers. They are widely used in thermoplastic fibers, films, and molding applications. Generally, polyesters are produced by reaction of a diol with a dicarboxylic acid or a lower alkyl ester of a dicarboxylic acid, e.g., the dimethyl ester. At first, the corresponding dicarboxylic acid diester is formed. Next, the dicarboxylic acid diester is polycondensed at increasing temperature and reduced pressure. Both reaction steps can be accelerated by catalysts. Compounds of titanium (Ti), manganese (Mn), cobalt (Co) or zinc (Zn) are suitable for the transesterification, and compounds of antimony (Sb), titanium (Ti), lead (Pb), germanium (Ge), zinc (Zn) or tin (Sn) for the polycondensation, whereby the catalyst compounds are in general oxides, alcoholates, acetates, or carboxylates. The amount of metal ion in the catalyst compound ranges mostly between 20 and 500 ppm, based on polyester. Among these catalysts, the titanium compounds are considered the most effective and the most widely usable because they are non-poisonous and can be used in the esterification or transesterification reactions, as well as in the polycondensation reaction.

However, these catalysts often react with trace quantities of aldehyde-based impurities derived from the diol and produced in the polymerization process, which causes the resulting polymer to develop a more yellow color. Diol recovered from the manufacturing process contains increased amounts of these impurities, which are believed to include aldehydes and their condensation products. Because polyester manufacturers return the recovered diol back into the manufacturing process to decrease manufacturing costs, the yellowing phenomenon increases as more and more impurities from the recovered diol accumulate and impact the polyester production. U.S. Pat. No. 4,110,316 describes such a polyester manufacturing process that recovers diol from the polymerization vessels for reuse in the process.

Increased yellowing of the polyester limits the subsequent downstream uses of the polyester. For example, many end-use applications require polyester sheets to be as clear (non-yellow) as possible.

There have been several attempts to improve the color of polyester. WO 02/18471 discloses a process for purifying a polyester precursor wherein a polyester oligomer derived from terephthalic acid and one or more diols is decolorized by hydrogenating the oligomer.

The non-examined Japanese patent application, Kokai No. SHO 51[1976]-1403, discloses a method for purifying crude ethylene glycol by first distilling the ethylene glycol followed by hydrogenation.

The examined Japanese patent application, Kokoku No. HEI 4[1992]-28247, discloses a method for purifying crude ethylene glycol formed in the preparation of ethylene oxide. This method includes distilling the crude glycol, hydrogenating the crude distilled glycol, and then purifying the resulting glycol by, for example, vacuum distillation.

As shown in these previous disclosures, removing color-forming impurities from a glycol (diol) stream has been accomplished in multiple steps. While one of the steps may be hydrogenation, at least one other purifying step, such as distillation, has been required to achieve the desired result.

Therefore, it is desired to have a process for removing impurities from recovered diol before the diol is recycled to the beginning of a polyester manufacturing process, whereby the recovered diol is effective in producing a polyester polymer product with improved color (e.g., reduced yellowing as compared with processes where the diol impurities are not removed, or are not removed as effectively as the invention described herein).

It is also desired to produce polyester while recycling the recovered diol, such that the polyester has good color properties.

It is also desired to provide a process for producing polyester from inferior grades of starting materials (diols, dicarboxylic acids and lower alkyl esters of dicarboxylic acids) without adversely impacting the color properties of the resulting polyester.

SUMMARY OF THE INVENTION

Surprisingly, we have found that polyesters with good color quality are produced when excess diol from the esterification and polycondensation reactions of the polyester manufacturing process is captured for recycle, the recycle stream of diol is hydrogenated to remove impurities, and subsequently the purified diol is recycled to the beginning of the polyester manufacturing process. The purified diol need not be distilled before it is recycled.

One aspect of the invention is a process for producing polyester that is suitable for fiber, resin or film applications, which comprises: (a) forming a slurry of a diol selected from the group consisting of ethane diol, propane diol and butane diol with a dicarboxylic acid selected from the group consisting of terephthalic acid and isophthalic acid; (b) esterifying the slurry to form an oligomer; (c) polymerizing the oligomer; (d) capturing unspent diol as a recycle stream; (e) hydrogenating said recycle stream containing the unspent diol in the presence of hydrogen and at least one hydrogenation catalyst; and (f) returning the hydrogenated diol to the slurry. The resulting polyester has improved color properties as compared to polyester produced with recycled diol that has not been hydrogenated.

Another aspect of the invention is a process for making polyester, comprising: (a) transesterifying a diol selected from the group consisting of ethane diol, propane diol and butane diol with a dimethyl terephthalate to form a monomer; (b) polymerizing the monomer; (c) capturing unspent diol as a recycle stream; (d) hydrogenating said recycle stream containing the unspent diol in the presence of hydrogen and at least one hydrogenation catalyst; and (e) returning the hydrogenated diol to the slurry.

The hydrogenated diols have lower concentrations of color-forming impurities such as crotonaldehyde, acetaldehyde and 2-methyl-1,3-dioxolane than recycled diol that has not been hydrogenated. The resulting polyesters have improved color properties as compared to polyesters produced with recycled diol that has not been hydrogenated.

DETAILED DESCRIPTION OF THE INVENTION

Figure 1:
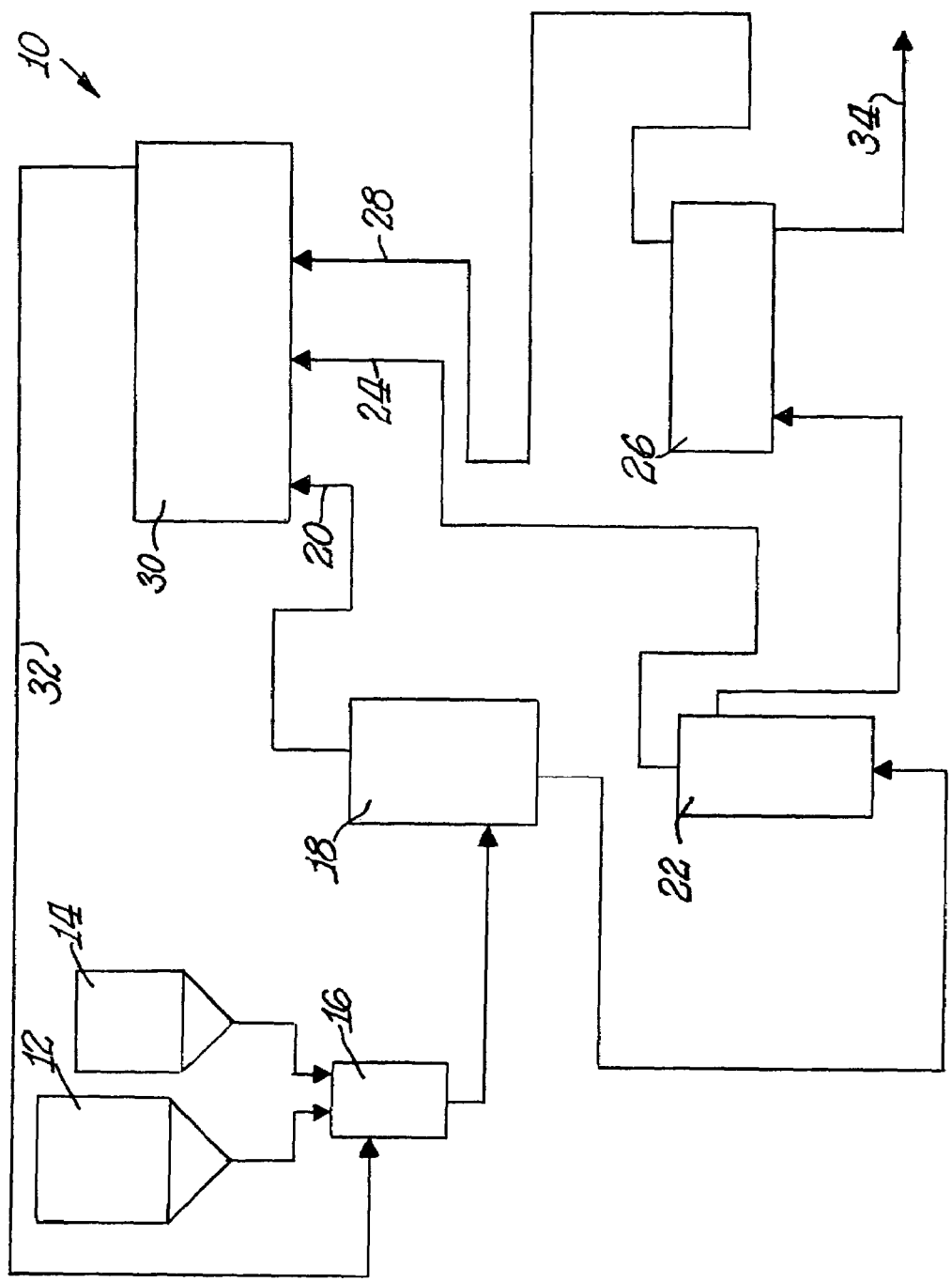
FIG. 1 is a schematic flow diagram of a continuous polymerization (CP) production system for polyester production which may be used to practice the process according to the invention.

Polyethylene terephthalate polymers and copolymers are the most widely known and most commercially important polyesters because of their high degree of crystallization, high softening point, and other various superior properties in terms of strength, chemical resistance, thermal resistance, weather resistance, electric insulation, etc. Such polyethylene terephthalates are industrially prepared by means of either a direct esterification or an ester-interchange reaction.

In the direct esterification reaction process, a dicarboxylic acid and a diol are heated to reaction temperatures ranging from 200° to 300° C. under atmospheric or positive pressure to esterify them directly into oligomer. Excess diol, water and low-boiling organic byproducts are removed from the reactor. The excess diol may be fed to a diol hydrogenation unit for hydrogenation and recycle to the mixing tank. The next phases of the polymerization involve pre-polycondensation and final polycondensation. The excess diol, water and low-boiling organic byproducts are removed from these two phases either by vacuum conditions or by a carrier gas and condensed. Again, the excess diol may be fed to the diol hydrogenation unit for hydrogenation and recycle to the mixing tank.

Polyesters may also be made by another manufacturing method, an ester-interchange method which comprises two steps: in the first step, a dimethyl carboxylate and a diol are reacted in the presence of catalysts at reaction temperatures ranging from 160° to 240° C. to synthesize monomer; and thereafter, in the second step, the synthesized, esterified compounds are polycondensed in the presence of polymerization catalysts at still higher reaction temperatures ranging from 260° to 300° C. under reduced pressure, in order to prepare high polymers. Again, excess, i.e., unspent, diol contaminated with water and low-boiling organic byproducts is removed.

Recently, the direct esterification method has been mainly adopted to prepare polyesters on an industrial scale, because it is more economical than the ester-interchange method.

Referring first to the Figure, there is shown in schematic a production system for polyester manufacture 10 using a direct esterification method. Dicarboxylic acid from a supply tank 12 and virgin diol from another tank 14 are fed individually into a mixing tank 16. The mixed components are then fed into the direct esterifier 18. The esterification reaction forms an oligomer. Excess diol from the esterification is removed from the direct esterifier 18 via line 20. The oligomer formed in the direct esterifier 18 is fed into the pre-polymerizer 22 where polymerization of the oligomer begins. Excess diol from the prepolymerization is removed from the pre-polymerizer 22 via line 24. The prepolymer formed in the pre-polymerizer 22 is fed into the finisher 26, where final polymerization occurs. Excess diol from the finisher 26 is removed via line 28. The excess, i.e., unspent, diol removed from any or all of the esterifier 18, pre-polymerizer 22 and finisher 26 via lines 20, 24 and 28, respectively, may be fed into the diol hydrogenation reactor 30. It is in this reactor 30 that the excess diol is hydrogenated. The hydrogenated diol is then carried via line 32 to mixing tank 16. Polymerized material from the finisher 26 is removed via line 34 and may then be pelletized, for example.

The excess diol that is removed from esterification and polycondensation phases of the polymerization of polyester in either the direct esterification or ester-interchange methods usually contains color-forming impurities. These impurities may include highly unsaturated, colored aldol condensation products of aldehydes formed during the esterification and polycondensation reactions by thermal degradation of polymer or diol.

According to the invention, the unsaturated products in the unspent diol are hydrogenated in the presence of a catalyst. Any catalyst that is customarily used in hydrogenation reactions can be used in this invention. Suitable catalysts include: platinum group elements such as platinum, rhodium, ruthenium, palladium, and the like, and metals such as iron, nickel, cobalt, or copper. Their forms as used may be among various known types for the usual metal catalysts, such as powdery, granular, skeletal, and the like. One may also use them as alloys between these metals or with other suitable metals. One or more of the metals themselves or their alloys may be supported on suitable known carriers such as carbon, alumina, titanium dioxide, silica gel, diatomaceous earth, and the like. The typical metal loading of a supported catalyst is 0.1 to 10% metal on support.

The hydrogenation of the recycled diol is accomplished at a temperature of not more than 300° C., preferably less than 200° C. and more preferably in the range of 20–150° C. The hydrogenation of the recycled diol is accomplished at a pressure of not more than 100 Bar(gauge), preferably less than 50 Bar(g) and more preferably in the range of 1 to 20 Bar(g). The purified diol is then recycled back to the slurry vessel.

Because excess diol contaminated with water and low-boiling by-products is recycled and hydrogenated, inferior grades of starting materials (i.e., diols, dicarboxylic acids and lower alkyl esters of dicarboxylic acids) may be used in the manufacturing process.

Examples of suitable dicarboxylic acids include, terephthalic acid and isophthalic acid.

Examples of suitable diols include, ethane diol, propane diol (especially 1,3-propane diol), and butane diol (especially 1,4-butane diol).

An example of a suitable ester is dimethyl terephthalate.

Various catalysts are used in the production of polyester. Compounds of titanium (Ti), manganese (Mn), cobalt (Co) or zinc (Zn) are suitable for transesterification, and compounds of antimony (Sb), titanium (Ti), lead (Pb), germanium (Ge), zinc (Zn) or tin (Sn) for polycondensation, whereby the compounds are in general oxides, alcoholates, acetates, or carboxylates. The amount of metal in the catalyst compound ranges mostly between 20 and 500 ppm, based on polyester. A mixture of catalysts may be used.

The present invention will now be further described with reference to specific examples. It should be understood that these examples are intended to be illustrative only, and the present invention is not limited to the conditions, materials or devices recited therein.

In this specification, all parts and percentages are by weight unless otherwise noted. The following test methods were used to characterize the recycled ethylene glycol and the final polyester polymer.

1. Gas Chromatography (G.C.) test method—ppm of specific aldehydes in the diol were analyzed with a HP 6890 Gas Chromatograph from Hewlett-Packard Company of Palo Alto, Calif. Chromatography permits direct quantification of the levels of acetaldehyde and crotonaldehyde.

2. Polymer Color test method: the L*, a*, b* and YIE values are determined using a Color-view spectrophotometer, model number 9000, from BYK Gardner Inc. of Columbia, Md.

EXAMPLE 1

A 10 ml sample of recycle ethylene glycol from a PET continuous polymerizer was mixed with 0.05 g of a 1% palladium on carbon catalyst. The gas space above the sample was purged of oxygen by pressurizing with nitrogen and venting. The sample was heated to 50° C. and the gas space pressurized to 20 Bar(g) using hydrogen gas while the mixture was agitated with a magnetic stirrer. The sample was held at pressure and temperature, and agitated for 1 hr before being depressurized and cooled. The sample was removed, filtered and analyzed. Using the same experimental method, a control experiment was conducted using an identical recycle glycol sample and the same conditions, but without a hydrogenation catalyst present.

Prior to the above described hydrogenation, the recycle glycol contained 20 ppm crotonaldehyde (CA), 456 ppm acetaldehyde (M) and 6876 ppm 2-methyl-1,3-dioxolane (MD).

Following the hydrogenation, the hydrogenated recycle glycol was found to have 0 ppm CA, 415 ppm AA and 6801 ppm MD. This equates to a 100% removal of CA, 9% removal of M and 1% removal of MD. By contrast, the control sample contained 16 ppm CA, 392 ppm AA and 6852 ppm MD after heating, pressurization and agitation.

EXAMPLES 2–9

Using the same experimental method as Example 1, but with different ranges of temperatures, pressures, residence times and catalyst types, the results as set forth in Table 1 were obtained:

TABLE 1

| No. | Catalyst | Temp (° C.) | Press (Bar(g)) | Catalyst Mass (g) | Time (hr) | % removal of CA | % removal of AA | % removal of MD |
|---|---|---|---|---|---|---|---|---|
| 2. | 5% Pd on Carbon | 100 | 20 | 0.05 | 4 | 100 | 16 | 11 |
| 3. | 1% Pt on Carbon | 50 | 5 | 0.25 | 1 | 100 | 4 | 7 |
| 4. | 5% Ru on Carbon | 100 | 20 | 0.05 | 4 | 100 | 37 | 30 |
| 5. | 1% Pd on Alumina | 50 | 20 | 0.05 | 1 | 45 | 4 | 3 |
| 6. | 1% Pt on Alumina | 100 | 20 | 0.05 | 1 | 100 | 19 | 6 |
| 7. | 5% Ru on Alumina | 50 | 5 | 0.05 | 1 | 22 | 1 | 3 |
| 8. | 5% Ru on Carbon | 150 | 20 | 0.25 | 4 | 93 | 83 | 76 |
| 9. | 1% Pd on Carbon and 5% Ru on Carbon | 100 | 20 | 0.05 of each | 1 | 100 | 31 | 23 |

EXAMPLE 10

Using the same experimental method as Example 1, with conditions of 50° C., 20 Bar(g), 1 hour and 0.05 g 5% ruthenium on carbon catalyst, a sample of hydrogenated glycol was collected. The sample was removed, filtered and analyzed. In a second step, this sample was mixed with 0.05 g of a 1% Palladium on carbon catalyst. The gas space above the sample was purged of oxygen by pressurizing with nitrogen and venting. The sample was heated to 50° C. and the gas space pressurized to 20 Bar(g) using hydrogen gas while the mixture was agitated with a magnetic stirrer. The sample was held at pressure and temperature, and agitated for 4 hours before being depressurized and cooled. The sample was removed, filtered and analyzed.

Prior to hydrogenation, the recycle glycol contained 12 ppm CA, 400 ppm M and 6154 ppm MD.

Following the second hydrogenation step, the treated recycle glycol contained 0 ppm CA, 341 ppm AA and 4869 ppm MD. This equates to a 100% removal of CA, 15% removal of M and 21% removal of MD.

EXAMPLE 11

In a further experiment a sample of ethylene glycol containing 58 ppm crotonaldehyde (CA), 693 ppm acetaldehyde (M) and 9967 ppm 2-methyl-1,3-dioxolane (MD) was fed to a fixed bed of 431 g of 5% Ruthenium on carbon catalyst. The glycol was pumped from an ambient feed vessel at a flowrate of approximately 1 liter per hour to a 7 liter electrically heated preheat vessel with an operating temperature of 150 Deg C. The preheated glycol was passed by gravity to an electrically heated reaction vessel containing the fixed bed hydrogenation catalyst. The reactor was pressurized with hydrogen to 10 Barg and its temperature was controlled to approximately 150 Deg C. Glycol leaving the reactor was collected in a buffer vessel before being transferred to a collection vessel where it was cooled to 40 Deg C. before discharging.

Following the hydrogenation, the hydrogenated recycle glycol was found to have 0 ppm CA, 95 ppm M and 2794 ppm MD. This equates to a 100% removal of CA, 86% removal of M and 72% removal of MD.

EXAMPLE 12

In a further experiment, polyester was manufactured in a 15-liter batch autoclave using terephthalic acid (TA) and virgin ethylene glycol (EG). TA, EG and a titanium-based polycondensation catalyst were charged to the autoclave, mixed and heated to 250° C., esterification occurs and the water of reaction was removed by distillation of the overhead product. The temperature was then gradually increased to a final batch temperature of 300° C. During this time the vessel was evacuated to remove glycol as the polycondensation proceeds. Once the autoclave stirrer indicates the target viscosity had been reached the vacuum was released and the polymer cast as chip.

The L*, a*, b* color of the polymer chip was measured giving L* of 62.99, a* of −2.16 and b* of 8.15.

EXAMPLE 13

Using the same experimental method as Example 12, polyester is manufactured in a 15-liter batch autoclave using TA and impure EG. The impure EG was prepared by taking 1.81 Kg virgin EG and adding 1.1 g AA, 15.5 g MD and 0.09 g CA.

The L*, a*, b* color of the polymer chip was measured giving L* of 70.65, a* of −2.45 and b* of 10.74.

We claim:

1. A process for making a polyester which is a polyalkylene terephthalate, comprising:
   a. forming a slurry of a diol selected from the group consisting of ethane diol, propane diol and butane diol with a dicarboxylic acid selected from the group consisting of terephthalic acid and isophthalic acid;
   b. esterifying the slurry to form an oligomer;
   c. polymerizing the oligomer;
   d. capturing unspent diol as a recycle stream;
   e. hydrogenating said recycle steam containing the unspent diol in the presence of hydrogen and at least one hydrogenation catalyst; and
   f. returning the hydrogenated diol to the slurry.

2. The process of claim 1, wherein the hydrogenation catalyst is selected from the group consisting of: platinum, rhodium, ruthenium, palladium, iron, nickel, cobalt, copper and combinations of two or more thereof.

3. The process of claim 1, wherein before the hydrogenated recycle stream is returned to the slurry, it is again hydrogenated one or more times in the presence of hydrogen and at least one hydrogenation catalyst.

4. A process for making a polyester which is an alkylene terephthalate, comprising:
   a. transesterifying a diol selected from the group consisting of ethane diol, propane diol and butane diol with dimethyl terephthalate to form a monomer;
   b. polymerizing the monomer;
   c. capturing unspent diol as a recycle stream;
   d. hydrogenating said recycle stream containing the unspent diol in the presence of hydrogen and one or more hydrogenation catalysts; and
   e. returning the hydrogenated diol to the slurry.

5. The process of claim 4, wherein the hydrogenation catalyst is selected from the group consisting of: platinum, rhodium, ruthenium, palladium, iron, nickel, cobalt, copper and combinations of two or more thereof.

6. The process of claim 4, wherein before the hydrogenated recycle stream is returned to the slurry, it is again hydrogenated one or more times in the presence of hydrogen and at least one hydrogenation catalyst.

* * * * *

UNITED STATES PATENT AND TRADEMARK OFFICE
CERTIFICATE OF CORRECTION

PATENT NO. : 7,129,316 B2 Page 1 of 1
APPLICATION NO. : 10/753044
DATED : October 31, 2006
INVENTOR(S) : Finbar Gerald McDonnell et al.

It is certified that error appears in the above-identified patent and that said Letters Patent is hereby corrected as shown below:

At column 7, line 23, delete "steam" and replace it with --stream--.

Signed and Sealed this

Second Day of January, 2007

JON W. DUDAS
*Director of the United States Patent and Trademark Office*